United States Patent
Dominique et al.

(10) Patent No.: US 8,144,667 B2
(45) Date of Patent: Mar. 27, 2012

(54) METHODS FOR CHANNEL QUALITY PREDICTION ERROR CALCULATION AND TRANSMISSION POWER ADJUSTMENT IN A WIRELESS NETWORK

(75) Inventors: Francis Dominique, Rockaway, NJ (US); Nandu Gopalakrishnan, Madison, NJ (US); Srinivas Kadaba, Chatham, NJ (US); Hongwei Kong, Denville, NJ (US); Walid Nabhane, Bedminster, NJ (US)

(73) Assignee: Alcatel Lucent, Paris (FR)

( * ) Notice: Subject to any disclaimer, the term of this patent is extended or adjusted under 35 U.S.C. 154(b) by 1411 days.

(21) Appl. No.: 11/645,590

(22) Filed: Dec. 27, 2006

(65) Prior Publication Data

US 2008/0160917 A1 Jul. 3, 2008

(51) Int. Cl.
*H04B 7/216* (2006.01)
(52) U.S. Cl. ........ 370/335; 455/69; 455/522; 455/67.11
(58) Field of Classification Search .................. 370/335; 455/522, 69
See application file for complete search history.

(56) References Cited

U.S. PATENT DOCUMENTS

| 6,088,324 A * | 7/2000 | Sato ............................ 370/203 |
| 7,218,949 B2 * | 5/2007 | Koo et al. ..................... 455/522 |
| 2004/0067757 A1 * | 4/2004 | Fukui ........................... 455/453 |
| 2007/0072610 A1 * | 3/2007 | Qiao et al. .................... 455/436 |

FOREIGN PATENT DOCUMENTS

WO    WO 2004042982 A2 *   5/2004

* cited by examiner

*Primary Examiner* — Nimesh Patel
(74) *Attorney, Agent, or Firm* — Harness, Dickey & Pierce, P.L.C.

(57) ABSTRACT

One embodiment includes determining a channel quality prediction error indicative a channel quality for a first time interval. The first time interval includes of a plurality of sub-frames, and the channel quality prediction error is calculated based on a first channel quality indicator associated with a first sub-frame and a second channel quality indicator associated with a second sub-frame. The first subframe and the second sub-frame are temporally spaced from one another. For example, the first subframe and the second subframe are temporally spaced apart by at least the length of the first time interval. More specifically, the second subframe may be received the first time interval after the first subframe.

6 Claims, 6 Drawing Sheets

US 8,144,667 B2

METHODS FOR CHANNEL QUALITY PREDICTION ERROR CALCULATION AND TRANSMISSION POWER ADJUSTMENT IN A WIRELESS NETWORK

CROSS-REFERENCE TO RELATED APPLICATIONS

This application is related to co-pending U.S. patent application Ser. No. 11/194,629, filed Aug. 2, 2005 to Dominique et al. and entitled "CHANNEL QUALITY PREDICTOR AND METHOD OF ESTIMATING A CURRENT CHANNEL CONDITION IN A WIRELESS COMMUNICATIONS NETWORK," and to co-pending U.S. patent application Ser. No 11/139,693, filed on May 31, 2005 to Dominique et al. and entitled "METHOD OF PATH MONITORING IN A WIRELESS COMMUNICATIONS SYSTEM." The entire contents of each of these co-pending U.S. patent applications are incorporated herein by reference.

BACKGROUND OF THE INVENTION

1. Field of the Invention

The present invention relates generally to a wireless communications network, and more particularly, to methods for channel quality prediction error calculation and methods for adjusting transmission power in a wireless communications network.

2. Description of Related Art

A cellular communications network typically includes a variety of communication nodes coupled by wireless or wired connections and accessed through different types of communications channels. Each of the communication nodes includes a protocol stack that processes the data transmitted and received over the communications channels. Depending on the type of communications system, the operation and configuration of the various communication nodes can differ and are often referred to by different names. Such communications systems include, for example, a Code Division Multiple Access 2000 (CDMA2000) system and Universal Mobile Telecommunications System (UMTS).

UMTS is a wireless data communication and telephony standard which describes a set of protocol standards. UMTS sets forth the protocol standards for the transmission of voice and data between a base station (BS) or Node B and a mobile or User Equipment (UE). UMTS systems typically include multiple radio network controllers (RNCs). The RNC in UMTS networks provides functions equivalent to the Base Station Controller (BSC) functions in GSM/GPRS networks. However, RNCs may have further capabilities including, for example, autonomously managing handovers without involving mobile switching centers (MSCs) and Serving General Packet Radio Service (GPRS) Support Nodes (SGSNs). The Node B is responsible for air interface processing and some Radio Resource Management functions. The Node B in UMTS networks provides functions equivalent to the Base Transceiver Station (BTS) in GSM/GPRS networks. Node Bs are typically physically co-located with an existing GSM base transceiver station (BTS) to reduce the cost of UMTS implementation and minimize planning consent restrictions.

FIG. 1 illustrates a conventional communication system 100 operating in accordance with UMTS protocols. Referring to FIG. 1, the communication system 100 may include a number of Node Bs such as Node Bs 120, 122 and 124, each serving the communication needs of UEs such as UEs 105 and 110 in their respective coverage area. The Node Bs are connected to an RNC such as RNCs 130 and 132, and the RNCs are connected to a MSC/SGSN 140. The RNC handles certain call and data handling functions, such as, as discussed above, autonomously managing handovers without involving MSCs and SGSNs. The MSC/SGSN 140 handles routing calls and/or data to other elements (e.g., RNCs 130/132 and Node Bs 120/122/124) in the network or to an external network. Further illustrated in FIG. 1 are conventional interfaces Uu, Iub, Iur and Iu between these elements.

Third generation wireless communication protocol standards (e.g., 3GPP-UMTS, 3GPP2-CDMA2000, etc.) may employ a dedicated traffic channel in the uplink (e.g., a communication flow between a mobile station (MS) or UE and a base station (BS) or Node B). The dedicated traffic channel may include a data part (e.g., a dedicated physical data channel (DPDCH) in accordance with UMTS protocols, a fundamental channel or supplemental channel in accordance with CDMA2000 protocols, etc.) and a control part (e.g., a dedicated physical control channel (DPCCH) in accordance with UMTS protocols, a pilot/power control sub-channel in accordance with CDMA2000 protocols, etc.).

High Speed Downlink Packet Access (HSDPA) is introduced in Release 5 of the third generation wireless standards for 3GPP-UMTS. To achieve high-speed data transmissions, two new channels in the downlink are introduced; namely, a high speed shared control channel (HS-SCCH) and a high speed downlink shared channel (HS-DSCH). The HS-SCCH carries the control information for the HS-DSCH (the actual packet data). The HS-DSCH is transmitted using a high speed physical downlink shared channel (HS-PDSCH). The HS-SCCH and HS-PDSCH for one cell (e.g., one of Node Bs 120, 122, 124, etc.) are shared by all HSDPA users (e.g., UE 105, UE 110, etc.) in that cell. A Node B scheduler (e.g., for one of Node B 120, Node B 122, Node B 124, etc.) decides which UE (e.g., UE 105/110) to transmit to, a given amount of data to transmit, a given power level for the transmission and a given modulation/coding format for the transmission based on a number of factors, such as an instantaneous downlink quality, quality of services (QoS) requirements, etc. After the Node B scheduler determines the parameters for the transmission, the transmission is scheduled. The data format as well as user identification information is carried in the HS-SCCH that accompanies the HS-PDSCH.

Knowledge of real-time downlink channel quality at the Node B scheduler may affect the efficiency of a HSDPA system. In the current UMTS-HSDPA standards, the downlink channel quality is determined by measuring the channel quality at the UE (e.g., UE 105, UE 110, etc.) and having the UE report the measured channel quality to the Node B (e.g., Node B 120, Node B 122, Node B 124, etc.) through a code channel in the uplink. The uplink control channel is a newly introduced high speed dedicated physical control channel (HS-DPCCH). The HS-DPCCH is introduced in Release 5 of the third generation wireless standards for 3GPP-UMTS to support HSDPA operations and may carry acknowledgment (ACK) and negative ACK (NACK) signals as well as a channel quality indicator (CQI) signal. The measured channel quality may be quantized (e.g., to a 5 bit binary number) at the UE to generate the CQI signal. At the Node B, the CQI signal may be converted into a channel quality metric, for example a common pilot channel (CPICH) carrier-to-noise ratio (Ec/Nt).

For stationary or very low mobility (e.g., slow moving) UEs, the Node B scheduler may use the CPICH Ec/Nt as a measure of the UE's current channel quality because the UE is moving slowly and the CPICH Ec/Nt may approximate the UE's current channel quality. However, as mobility or speed of the UE increases, the CPICH Ec/Nt may be less likely to function as an accurate indicator of the UE's current channel quality. For example, some wireless communication systems have a latency of 9 milliseconds (ms), which means the Node B scheduler is using a value for the CPICH Ec/Nt that is approximately 9 ms older than a current CPICH Ec/Nt. In this example, the conventional measure of the CPICH Ec/Nt may work well for UEs at a velocity less than 10 kilometers per hour (Kmph), but not necessarily for higher velocity UEs.

SUMMARY OF THE INVENTION

The present invention relates to a method and apparatus for estimating a channel condition. In particular, at least one embodiment is related to a method of determining error in a channel quality measurement associated with a transmission channel at a transmitter.

For example, one embodiment includes determining a channel quality prediction error indicative of a channel quality for a first time interval. The first time interval includes of a plurality of subframes, and the channel quality prediction error is calculated based on a first channel quality indicator associated with a first sub-frame and a second channel quality indicator associated with a second sub-frame. The first sub-frame and the second sub-frame are temporally spaced from one another. For example, the first subframe and the second subframe are temporally spaced apart by at least the length of the first time interval. More specifically, the second subframe may be received after the first subframe.

The channel quality prediction error may be used in many ways. For example, the transmission power at the transmitter may be adjusted based on the calculated channel quality prediction error.

In one embodiment, determining the channel quality prediction error includes calculating a first channel quality metric for the first subframe based on the first channel quality indicator, and predicting a channel quality metric for at least one of the plurality of subframes within the first time interval based on the first channel quality metric. The determination further includes calculating a second channel quality metric for the second subframe, and estimating a channel quality metric for the at least one of the plurality of subframes within the first time interval based on the second channel quality metric. The channel quality prediction error is determined based on the predicted channel quality metric and the estimated channel quality metric.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EXAMPLE EMBODIMENTS

In order to better understand the present invention, an example of a conventional uplink frame structure for a UMTS wireless communication system and an example communication flow of a conventional downlink channel quality reporting will be described. This will be followed by descriptions of downlink channel quality prediction and channel quality prediction error calculations, according to example embodiments of the present invention.

Figure 1:
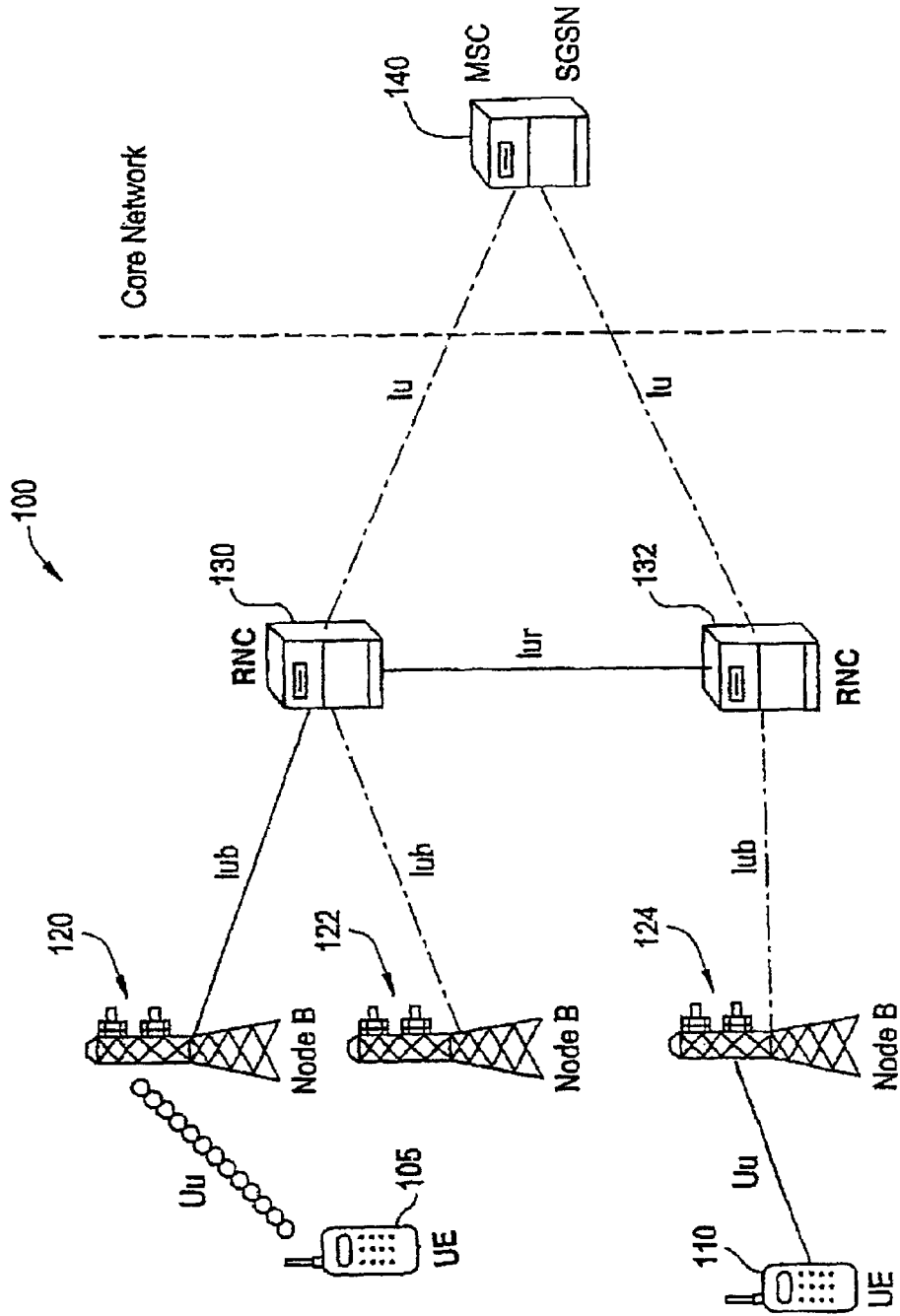
FIG. 1 illustrates a conventional communication system operating in accordance with Universal Mobile Telecommunications System (UMTS) protocols.
Figure 2:
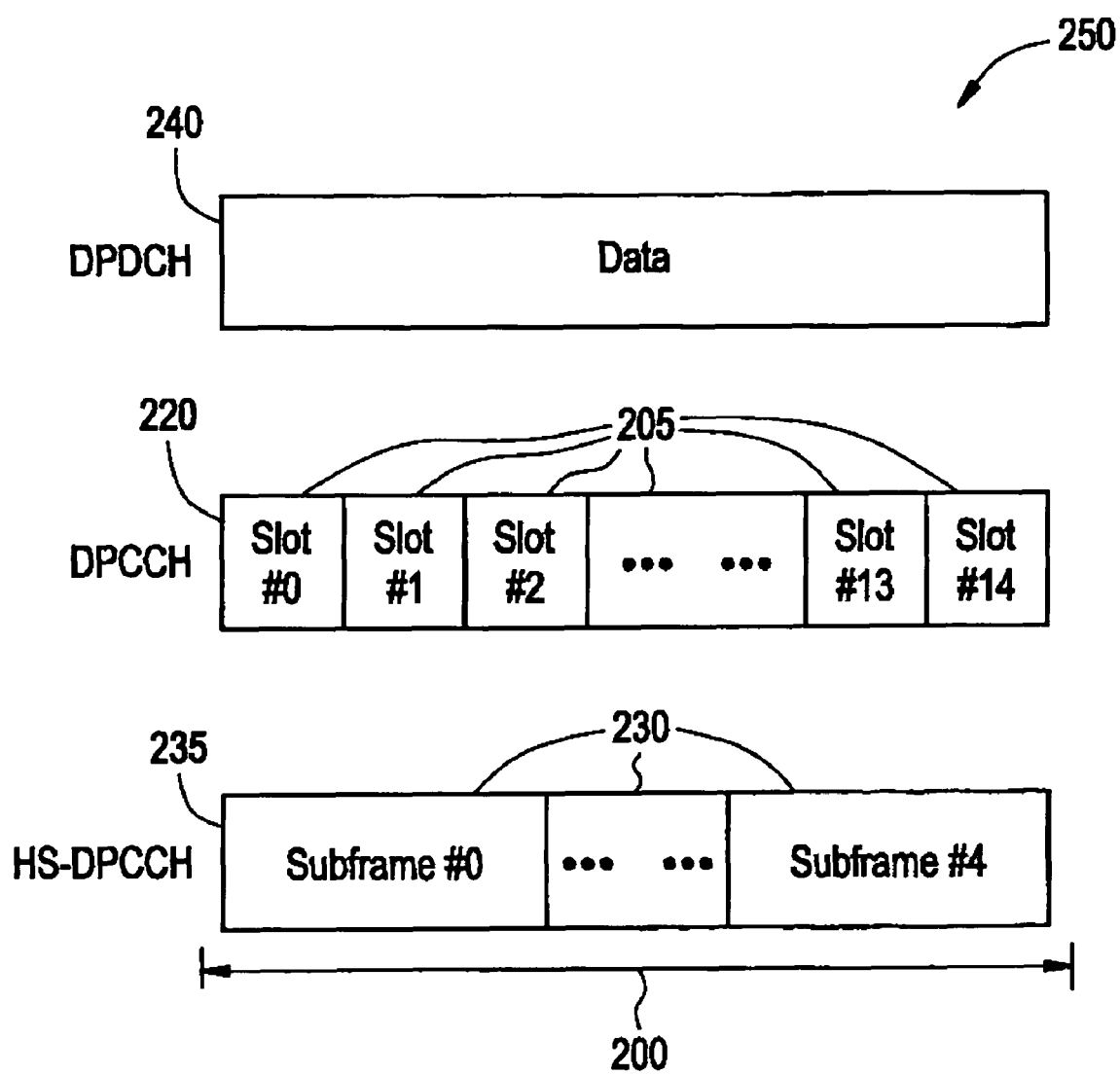
FIG. 2 illustrates an example of a frame of a UMTS uplink dedicated traffic channel including a high speed dedicated physical control channel (HS-DPCCH)

FIG. 2 illustrates an example of a frame 200 of a UMTS uplink dedicated traffic channel 250 including a DPDCH 240, a DPCCH 220 and a high speed dedicated physical control channel (HS-DPCCH) 235. Each frame 200 may have a length of, for example, 10 milliseconds (ms) and, for the DPCCH 220, may be partitioned into a plurality of slots 205 (e.g., 15 slots). Each slot 205 may have a length of, for example, 2560 chips, which may correspond to one power-control period, and may have a duration of, for example $\frac{2}{3}$ ms. The DPCCH 220 will be described in further detail below with respect to FIG. 3.

Each of the DPCCH 220 and the DPDCH 240 may be code multiplexed. The DPDCH 240 may include information transmitted from a mobile station or user equipment (UE). The HS-DPCCH 225 may include a plurality of subframes 230 within the frame 200. Each subframe 230 in the HS-DPCCH may correspond to a plurality of slots 205 in the DPCCH.

Figure 3:
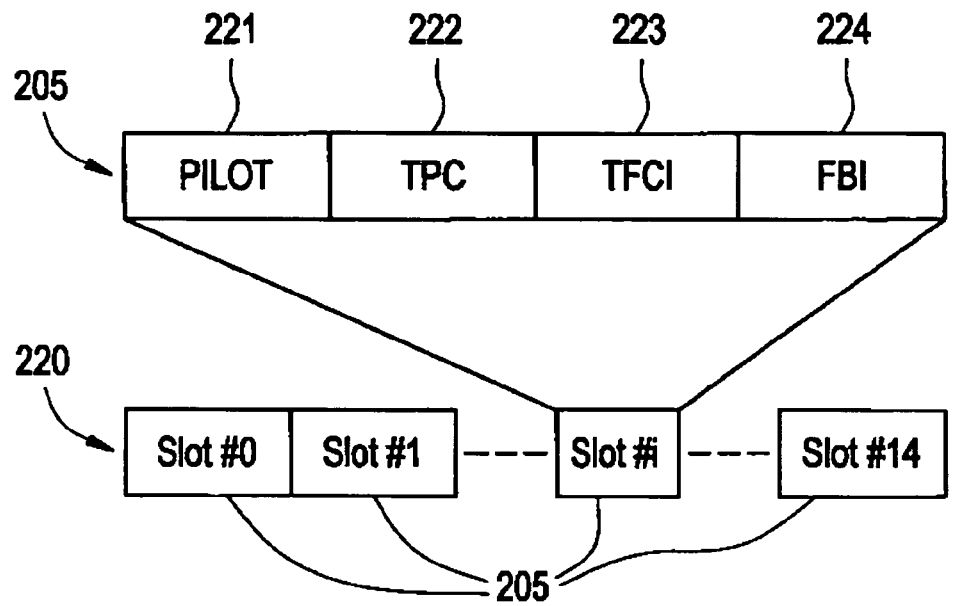
FIG. 3 illustrates an example slot structure for a given slot of a DPCCH.

FIG. 3 illustrates an example slot structure for a given slot 205 of the DPCCH 220. Each slot 205 in the frame 200 of the DPCCH 220 may include control information, for example, a pilot signal 221, transport format combination indicator (TFCI) bits 222, feedback information (FBI) 223, and a transmit power control (TPC) command 224.

In an example, each slot 205 may include a total of 10 bits, with a given number of pilot bits (e.g., pilot signal 221) and control bits (e.g., a combination of TPC bits in the TPC command 224, TFCI bits 222 and FBI bits 223). In a further example, each slot 205 may include 10 bits with 5 pilot bits, 2 TFCI bits, 1 FBI bit and 2 TPC bits. However, the number of total bits for each slot 205 as well as the bit composition of each slot 205 (e.g., other numbers of TFCI bits, FBI bits, pilot bits, TPC bits, etc.) may vary and may be controlled by a RNC (e.g., RNC 130, RNC 132, etc.).

The TFCI 222 may inform a Node B of the transport format of information (e.g., voice and/or data packets, frames, etc.) transmitted from a UE.

Each of the UE and the Node B may generate and transmit TPC bits in the TPC command 224 of the uplink DPCCH 220 and the downlink DPCCH (not shown), respectively, to control each others transmit power. When the UE communicates with, for example, a single Node B (e.g., when the UE is not in soft handoff), a single TPC command 224 may be received in each timeslot.

In an example, each slot 205 in the frame 200 may include a TPC command 224 with either 1 or 2 TPC bits. If a given slot 205 includes 2 TPC bits, the values for each of the 2 TPC bits may be identical; namely, the TPC bits in the TPC command 224 are either both "0" or both "1", given as "00" and "11", respectively. The TPC bits in the TPC command 224 may be used to adjust the downlink transmit power in order to converge the downlink transmit power to a desired target power. For example, if the TPC bits in the TPC command 224 are "0"

or "00", the downlink transmit power may be decreased. In another example, if the TPC bits in the TPC command 224 are "1" or "11", the downlink transmit power may be increased.

While FIGS. 2 and 3 illustrate a 3GPP-UMTS uplink frame structure, a 3GPP2-CDMA2000 uplink frame structure may be similar. However, a typical 3GPP2-CDMA2000 uplink frame structure does not include the above-described TFCI 222 and FBI 223.

Figure 4:
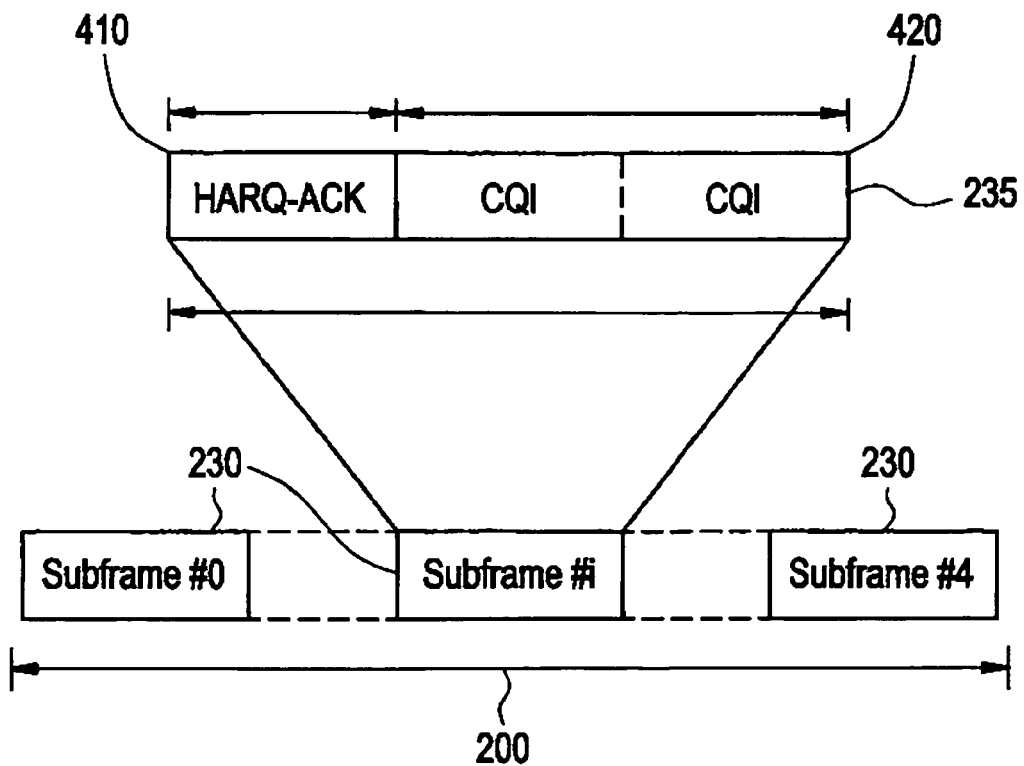
FIG. 4 illustrates a given subframe of a HS-DPCCH.

FIG. 4 illustrates a given subframe 230 of the HS-DPCCH 235. In the example where each frame 200 has a duration of 10 ms, each subframe 230 of the HS-DPCCH 235 may have a duration of 2 ms, which may be equivalent to 3 slots 205 for the DPCCH 220, where each slot 205 has a duration of ⅔ ms. Each subframe 230 may include a hybrid automatic repeat request (HARQ)-acknowledgment (ACK) 410 and a channel quality indicator (CQI) 420. In an example, the HARQ-ACK 410 may be allotted 2560 chips (e.g., corresponding to a first slot 205 of the subframe 230) and the CQI 420 may be allotted 5120 chips (e.g., corresponding to second and third slots 205 of the subframe 230).

The CQI 420 may be reported once for each subframe 230, for example at an end of a given subframe 230 for which the CQI 420 is being reported. Thus, a highest rate that a UE may transmit the CQI 420 to a Node B may be once for every 3 slots 205 (e.g., 2 ms). However, to conserve UE battery power, 3GPP-UMTS standards allow the CQI 420 to be updated at a lower rate, for example every 80 subframes.

Figure 5:
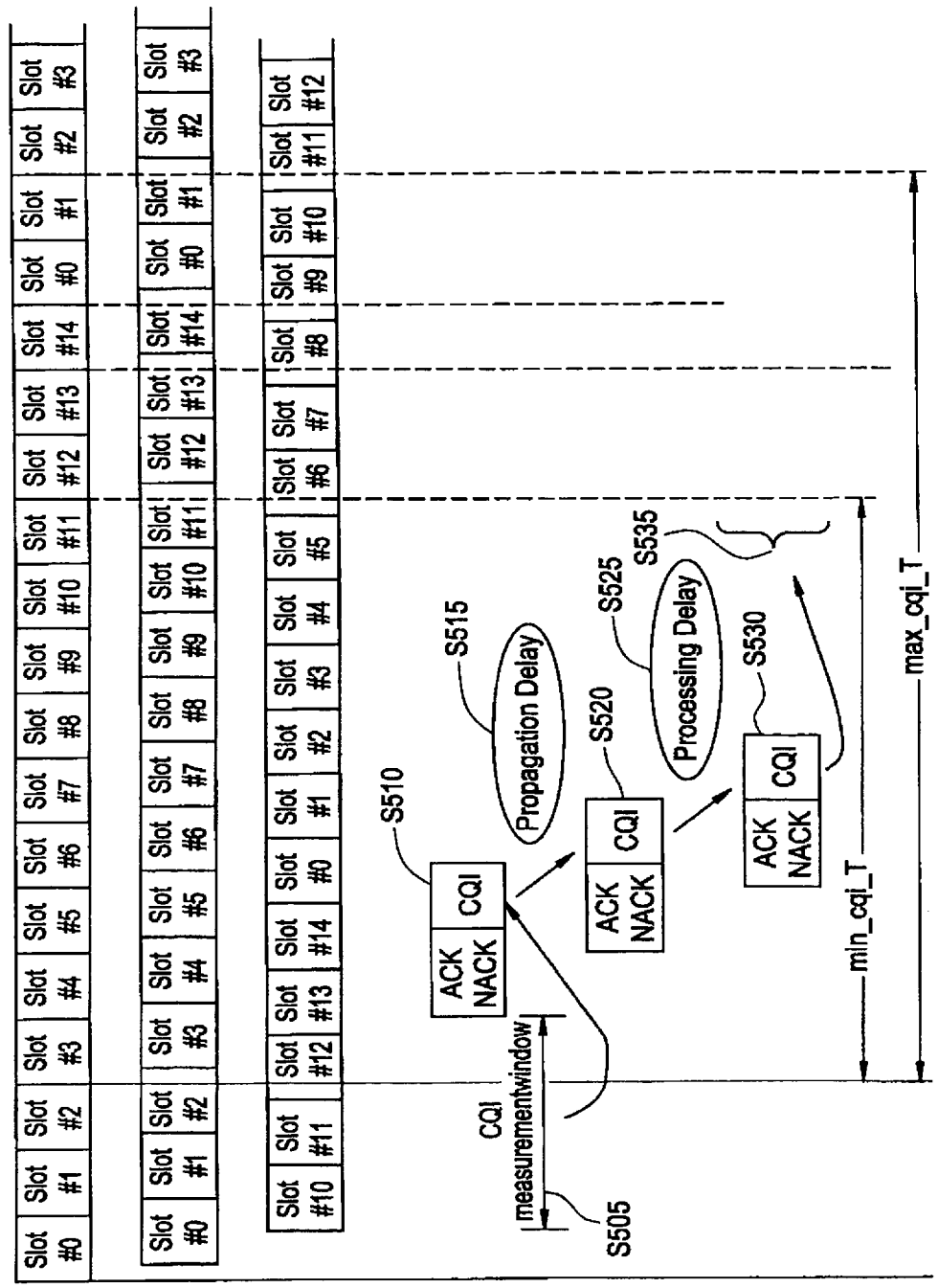
FIG. 5 illustrates a communication diagram of channel quality indicator (CQI) reporting.

FIG. 5 illustrates a communication diagram of conventional CQI 420 reporting.

Referring to FIG. 5, channel quality at a given UE (e.g., UE 105, 110, etc.) is measured (at S505) in a CQI measurement window. After the channel quality is measured (at S505), the given UE converts the measured channel quality into the CQI 420 and transmits (at S510) the CQI 420 for representing the measured channel quality to a Node B (e.g., Node B 120, 122, 124, etc.). The CQI 420 experiences propagation delay (at S515) during transmission from the UE to the Node B and arrives at the Node B at a later time than it was initially transmitted by the given UE. The Node B receives the CQI 420 (at S520) and transfers the CQI 420 to the Node B scheduler, where the CQI 420 experiences a processing delay (at S525) during the transfer. The Node B scheduler receives the CQI 420 (at S530) and schedules an adjustment to downlink power (e.g., HS-SCCH power and/or selects an MCS for the HS-PDSCH) for transmissions from the Node B to the given UE based on the received CQI 420. The scheduled adjustment to the downlink power may take effect at a next downlink transmission (at S535). A given number of subframes may lapse between the measurement of the channel quality (at step S505) and the scheduled adjustment to the downlink power (at S535), where the given number of subframes numbers is at least min_CQI_T and no more than max_CQI_T. In an example, the min_CQI_T may be approximately 9 ms, which may correlate to 4.5 subframes or 13.5 slots. Various factors such as the propagation/processing delays of steps S515 and S525 may affect the min_CQI_T.

The above-described delays in the reporting of the CQI 420 may cause the downlink power to be adjusted based on older and/or inaccurate information at the Node B scheduler, for example in a situation where the channel quality at the UE changes rapidly (e.g., if the UE is moving at a high speed).

An example embodiment of the present invention will now be described with respect to FIGS. 6 and 7 where channel quality predictions and channel quality estimates are used to calculate channel quality prediction error metrics associated with each of a plurality of subframes within a subframe or time interval. The channel quality prediction error metrics may be indicative of a channel variation and may be used to more accurately set transmission power and or select transmission modulation coding formats (MCS).

Figure 6:
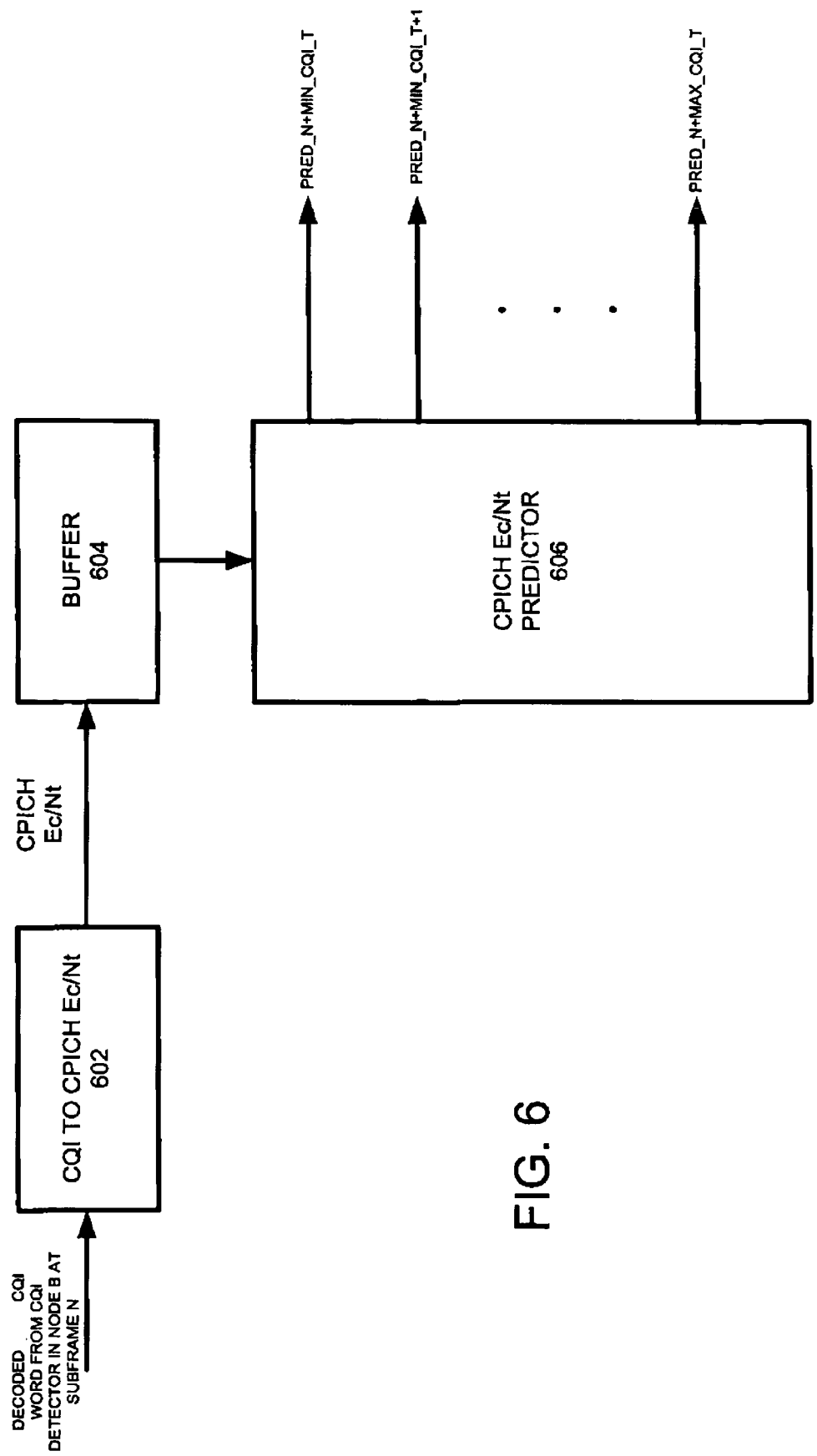
FIG. 6 illustrates a channel quality predictor, according to an example embodiment.

FIG. 6 is a block diagram of a channel quality predictor, according to an example embodiment of the present invention. FIG. 7 illustrates a channel quality prediction error calculator, according to an example embodiment of the present invention. Each of the channel quality predictor of FIG. 6 and the channel quality prediction error calculator of FIG. 7, according to example embodiments, may be located along with conventional and well-known components at a Node B. For example, the channel quality predictor of FIG. 6 and the channel quality prediction error calculator of FIG. 7 may be co-located at the Node B with a conventional CQI detector (not shown), which may detect and decode a received CQI into a five-bit CQI word. CQI detectors, and the operations performed by CQI detectors are well-known in the art, and thus, a detailed discussion will be omitted for the sake of brevity.

Referring to FIG. 6, a channel quality indicator (CQI) word (e.g., CQI 420) is received during a current subframe N and decoded by the above-discussed CQI detector (not shown). The decoded CQI word is input to a CQI to CPICH Ec/Nt converter 602. The converter 602 may convert the decoded CQI word into a channel quality metric, for example, CPICH Ec/Nt for the current subframe N. The channel quality metric Ec/Nt for the current subframe N may be output to buffer 604. The decoded CQI word and the resultant channel quality metric may be updated every K subframes, where K=max_CQI_T−min_CQI_T, and the buffer 604 may store channel quality metrics for a plurality of subframes. For example, the buffer 604 may store channel quality metrics for each subframe between the current subframe N and future subframe N+K. Because K=max_CQI_T−min_CQI_T, the number of subframes stored in the buffer 604 may also be represented as $(max_{13} CQI\_)-(min\_CQI\_T)$. The buffer 604 may output the channel quality metric for the current subframe N to the channel quality predictor 606.

The channel quality predictor 606 may generate a plurality of predicted channel quality metrics PRED_N+MIN_CQI_T, PRED_N+MIN_CQI_T+1, . . . , PRED_N+MAX_CQI_T based on the channel quality metric for current subframe N. Each of the predicted channel quality metrics PRED_N+MIN_CQI_T, PRED_N+MIN_CQI_T+1, . . . , PRED_N+MAX_CQI_T represents a predicted channel quality for a corresponding future subframe N+min_CQI_T, N+min_CQI_T+1, . . . , N+max_CQI_T. For example, channel quality metric PRED_N+MIN_CQI_T represents a predicted channel quality for subframe N+min_CQI_T received 'min_CQI_T' after current subframe N. The channel quality prediction block 606 may function, for example, as described in the above-noted co-pending U.S. patent application Ser. No. 11/194,629. However, it will be understood that any suitable channel quality prediction method and/or apparatus may be used such as a Weiner filter, Kalman filter, etc.

Still referring to FIG. 6, each of the predicted channel quality metrics PRED_N+MIN_CQI_T, PRED_N+MIN_CQI_T+1, . . . , PRED_N+MAX_CQI_T may be output to a corresponding one of a plurality of subtractors 708_T, 708_T+1, . . . , 708_MAX within the channel quality prediction error calculator shown in FIG. 7, and described in more detail below. For example, predicted channel quality metric PRED_N+MIN_CQI_T, may be output to the subtractor 708_T, the predicted channel quality metric PRED_N+MIN_CQI_T+1 may be output to the subtractor 708_T+1, and so on.

After a decoded CQI word for subframe $N+N_1$ has been received, a channel quality prediction error metric for each subframe between subframe $N+min\_CQI\_T$ and subframe $N+max\_CQI\_T$ may be calculated. $N_1$ may be a system parameter having a value greater than K or $max\_CQI\_T-min\_CQI\_T$. As time passes, each of the plurality of channel quality prediction error metrics may be used to determine a current channel quality error, which may be used to, for example, adjust transmission power.

As discussed above, FIG. 7 illustrates a channel quality prediction error calculator, according to an example embodiment of the present invention. As discussed above with regard to subframe N, the CQI detector (not shown) may be detect and decode a CQI received in subframe $N+N_1$.

Figure 7:
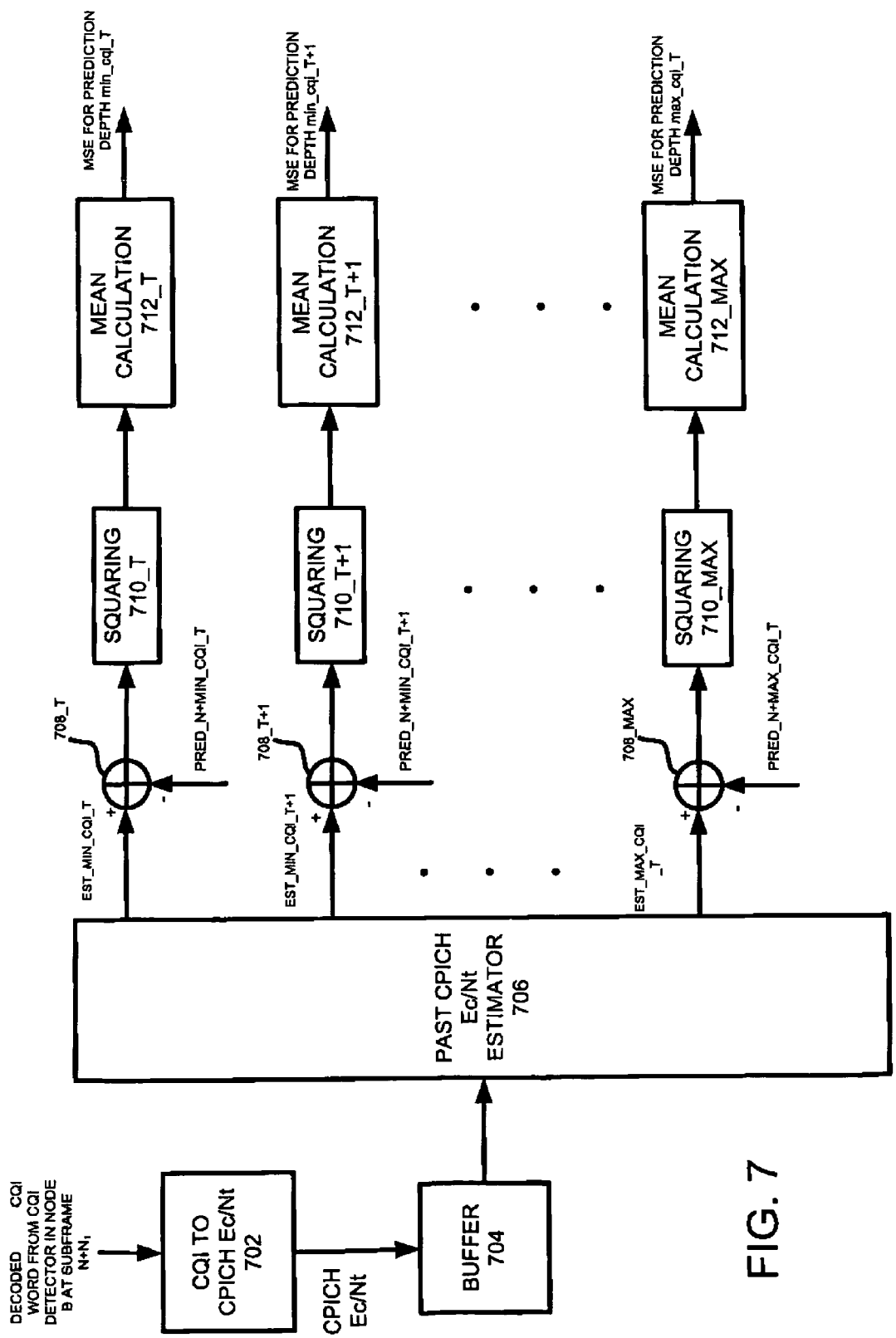
FIG. 7 illustrates a channel quality prediction error calculator, according to an example embodiment.

Referring to FIG. 7, the decoded CQI word for subframe $N+N_1$ from the CQI detector may be converted into a channel quality metric CPICH Ec/Nt for subframe $N+N_1$ at converter 702. The converter 702 functions in the same manner as the converter 602 shown in FIG. 6. The channel quality metric for subframe $N+N_1$ may be output and stored in a buffer 704. The buffer 704 may be the same as the buffer 604 of FIG. 6. For example, the buffer 704 may be capable of storing at least K number of subframes. However, the buffer 704 may be larger. The channel quality metric for subframe $N+N_1$ may be output to the past channel quality estimator 706.

The past channel quality estimator 706 may estimate channel quality metrics for each past subframe in the subframe interval from $N+min\_CQI\_T$ through $N+max\_CQI\_T$. Methods for estimating channel quality metrics for past subframes are well-known in the art, and thus, a detailed discussion will be omitted for the sake of brevity.

The past channel quality estimator 706 may output a plurality of estimated channel quality metrics $EST\_MIN\_CQI\_T$, $EST\_MIN\_CQI\_T+1$, ..., $EST\_MAX\_CQI$, each of which corresponds to one of past subframes $N+min\_CQI\_T$, $N+min\_CQI\_T+1$, ..., $N+max\_CQI\_T$. Each channel quality metric $EST\_MIN\_CQI\_T$, $EST\_MIN\_CQI\_T+1$, ..., $EST\_MAX\_CQI$ may be output to a corresponding subtractor 708_T, 708_T+1, ..., 708_MAX.

As noted above, the subtractors 708_T through 708_MAX may also receive a corresponding one of the predicted channel quality metrics $PRED\_N+MIN\_CQI$, $PRED\_N+MIN\_CQI+1$, ..., $PRED\_N+MAX\_CQI$ from the channel quality predictor of FIG. 6.

At each subtractor 708_T through 708_max, the predicted channel quality metric (e.g., $PRED\_N+MIN\_CQI$, $PRED\_N+MIN\_CQI+1$, ..., $PRED\_N+MAX\_CQI$) for a subframe may be subtracted from a corresponding estimated channel quality (e.g., $EST\_MIN\_CQI\_T$, $EST\_MIN\_CQI\_T+1$, ..., $EST\_MAX\_CQI$) for the same subframe within the subframe interval.

With respect to subframe $N+min\_CQI\_T$, for example, the predicted channel quality metric $PRED\_N+MIN\_CQI\_T$ for subframe $N+min\_CQI\_T$ may be subtracted from the estimated channel quality metric $EST\_MIN\_CQI\_T$ for subframe $N+min\_CQI\_T$. The difference between the predicted channel quality metric $PRED\_N+MIN\_CQI\_T$ and the estimated channel quality metric $EST\_MIN\_CQI\_T$ may be output to a squaring block At the squaring block 710_T, the difference may be squared and output to a mean calculation block 712_T. The mean calculation block 712_T may calculate a mean square error for the subframe $N+min\_CQI\_T$, or in other words, prediction depth $min\_CQI\_T$. The mean square error for prediction depth $min\_CQI\_T$ may serve as a channel quality prediction error metric for subframe $N+min\_CQI\_T$. The mean calculation block 712_T may be implemented using any well-known method, for example, using an FIR filter of an IIR type. These implementations are well known in the art, and thus, a detailed discussion will be omitted for the sake of brevity.

Each of the subtractors 708_T+1 through 708_MAX, squaring blocks 710_T+1 through 710_MAX and mean calculation blocks 712_T+1 through 712_MAX may function in the same manner as the subtractor 710_T, the squaring block 710_T and the mean calculation block 712_T, respectively.

With respect to the mean calculation blocks 712_T through 712_MAX, each of the mean calculation blocks 712_T through 712_MAX outputs a mean square error for a corresponding prediction depth. In other words, for example, the mean calculation block 712_T outputs a mean square error for prediction depth $min\_CQI\_T$, the mean calculation block 712_T+1 outputs a mean square error for prediction depth $min\_CQI\_T+1$, and so on.

The channel quality prediction error metrics for subframes $N+min\_CQI\_T$ through $N+max\_CQI\_T$ may be used to generate a channel quality prediction error for the subframe interval $max\_CQI\_T-min\_CQI\_T$. In at least one example embodiment, the latest or most recent computed channel quality prediction error metric for a subframe (e.g., the channel quality prediction error metric for subframe $N+max\_CQI\_T$), may be used along with a predicted CQI value to generate a channel quality prediction error for the subframe interval $max\_CQI\_T-min\_CQI\_T$.

Based on the channel quality prediction error and the predicted CQI for the subframe interval, the Node B scheduler may schedule an adjustment (e.g., an increase if the channel quality prediction error is large or decrease if the channel quality prediction error is small) to at least one downlink transmission parameter. In an example, the downlink transmission parameter may be downlink power. In this example, the Node B scheduler may increase or decrease downlink power on a downlink channel (e.g., one of a High Speed Downlink Shared Channel (HS-DSCH) and a High Speed Physical Downlink Shared Channel (HS-PDSCH)). Methodologies for adjusting downlink power on downlink channels based on CPICH Ec/Nt values are well known in the art and will not be discussed further for the sake of brevity.

In another example, the downlink transmission parameter may be a data encoding parameter. In this example, the adjustment step may increase or decrease the level of encoding/modulation on the HS-DSCH and/or the HS-PDSCH based on one or more of the mean square errors generated by the channel quality error estimator. Methodologies for adjusting data encoding/modulation levels on downlink channels based on CPICH Ec/Nt values are well known in the art and will not be discussed further for the sake of brevity.

In addition, or alternatively, the channel quality prediction error may be used to set control channel power, data channel power and/or modulation coding format (MCS) for transmission. The channel quality prediction error may also be used as an indicator of the channel variation.

A more specific example will now be discussed in detail for the sake of clarity.

As discussed above, the latest or most recent computed channel quality prediction error metric for a subframe (e.g., the channel quality prediction error metric for subframe $N+max\_CQI\_T$), may be used along with a predicted CQI value to generate a channel quality prediction error for the subframe interval $max_{13}CQI\_T-min\_CQI\_T$. For example, the most recent channel quality prediction error metric may be used to predict a range of CQIs, which may be received in the future, in this example, this may be referred to as the channel quality prediction error. The channel quality prediction error may allow the transmitter to predict a range in which one or more future channel qualities may fall.

For example, a relatively large most recent channel quality prediction error metric may result in a relatively large channel quality prediction error, which may indicate that predicted CQI values are varying quickly and relatively far from the mean predicted CQI value. This indicates a relatively large channel variation, which may inhibit accurate and/or proper prediction of channels in the transmitted HS-SCCH/HS-DSCH subframe. In this example, the offset (or margin) of power may be increased and/or the data rate(for the data portion) may be decreased.

On the other hand, a relatively small most recent channel quality prediction error metric may result in a relatively small channel quality prediction error, which may indicate predicted CQIs are relatively close to each other and to the mean predicted CQI. In this case, the predicted CQI is determined to be accurate enough and the power margin and/or the data rate need not be adjusted.

According to example embodiments, an entry table (e.g., a 2 entry table) may be used to determine the proper transmit power. Within the entry table, a transmit power may be correlated to each CQI value. The channel quality prediction error metric for each subframe tracks the speed of channel variation for the subframe. The faster the channel varies, the less accurately the channel may be predicted when transmitting. The less accurate the channel prediction, the higher the required transmission power because the transmission power must be high enough to cover all possible predicted CQI values. The slower the channel variation, or if there is no change, the more accurately the transmission power may be set. Accordingly, using the table, the transmitter may select and/or adjust the proper transmission power based on the predicted CQI and the most recent channel quality prediction error metric. That is, for example, the transmitter may select a transmission power corresponding to a CQI at the upper most end of the range determined based on the predicted CQI and the channel quality prediction error metric.

Example embodiments of the present invention being thus described, it will be obvious that the same may be varied in many ways. For example, while example embodiments of the present invention have been described with respect to 3GPP-UMTS, it is understood that other example embodiments of the present invention may employ other UMTS protocols, CDMA2000 protocols, and/or any other well-known wireless communication protocol. It is further understood that while above-described example embodiments are described as using a FIR and/or an IIR filter, any well-known filter may be used in other example embodiments of the present invention. Such variations are not to be regarded as a departure from the example embodiments of the invention, and all such modifications are intended to be included within the scope of the invention.

We claim:

1. A method of determining error in a channel quality measurement associated with a transmission channel at a transmitter, the method comprising:
determining, by a base station, a channel quality prediction error indicative a channel quality for a first time interval, the first time interval including of a plurality of subframes, the channel quality prediction error being calculated based on a first channel quality indicator associated with a first sub-frame and a second channel quality indicator associated with a second sub-frame, the first subframe and the second sub-frame being temporally spaced from one another, the first subframe and the second sub-frame being temporally spaced by at least the length of the first time interval, the determining step including,
calculating a first channel quality metric for the first subframe based on the first channel quality indicator;
predicting channel quality metrics for each future subframe with respect to the first subframe within the first time interval based on the first channel quality metric;
calculating a second channel quality metric for the second subframe based on the second channel quality indicator;
estimating channel quality metrics for each past subframe with respect to the second subframe within the first time interval based on the second channel quality metric;
calculating the channel quality prediction error based on the predicted channel quality metrics and the estimated channel quality metrics.

2. The method of claim 1, further comprising:
adjusting transmission power based on the calculated channel quality prediction error.

3. The method of claim 1, wherein the calculating the channel quality prediction error comprises:
subtracting each of the predicted channel quality metrics from a corresponding estimated channel quality metric to generate a plurality channel quality metric differences; and
generating the channel quality prediction error based on the plurality of channel quality metric differences.

4. The method of claim 3, wherein the generating the channel quality prediction error comprises:
squaring each of the plurality of channel quality metric differences; and
calculating the channel quality prediction error based on the squared channel quality metric differences.

5. The method of claim 4, further comprising:
adjusting transmission power based on the calculated channel quality prediction error.

6. A method of determining error in a channel quality measurement associated with a transmission channel at a transmitter, the method comprising:
determining, by a base station, a channel quality prediction error indicative a channel quality for a first time interval, the first time interval including of a plurality of subframes, the channel quality prediction error being calculated based on a first channel quality indicator associated with a first sub-frame and a second channel quality indicator associated with a second sub-frame, the first subframe and the second sub-frame being temporally spaced by at least the length of the first time interval, the determining step further including,
calculating a first channel quality metric for the first subframe based on the first channel quality indicator;
predicting channel quality metrics for future subframes with respect to the first sub-frame within the first time interval based on the first channel quality metric;
calculating a second channel quality metric for the second subframe based on the second channel quality indicator;

estimating channel quality metrics for past subframes with respect to the second subframe within the first time interval based on the second channel quality metric;

subtracting each of the predicted channel quality metrics from a corresponding one of the estimated channel quality metrics to generate a plurality of channel quality metric differences, each of the plurality of channel quality metric differences corresponds to one subframe in the first time interval; and squaring each of the plurality of channel quality metric differences, the channel quality prediction error being determined according to the plurality of channel quality metric differences.

* * * * *